UNITED STATES PATENT OFFICE.

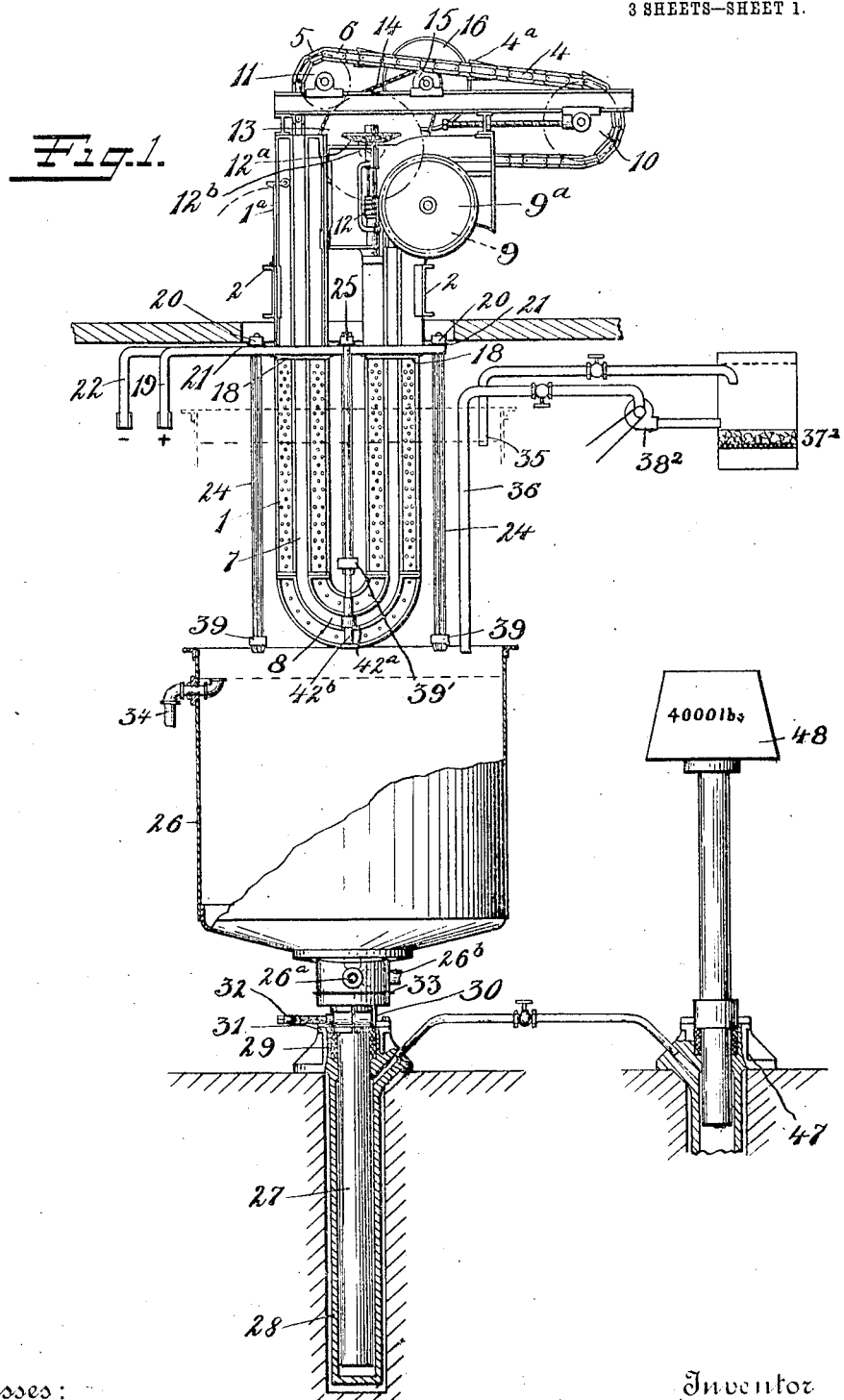

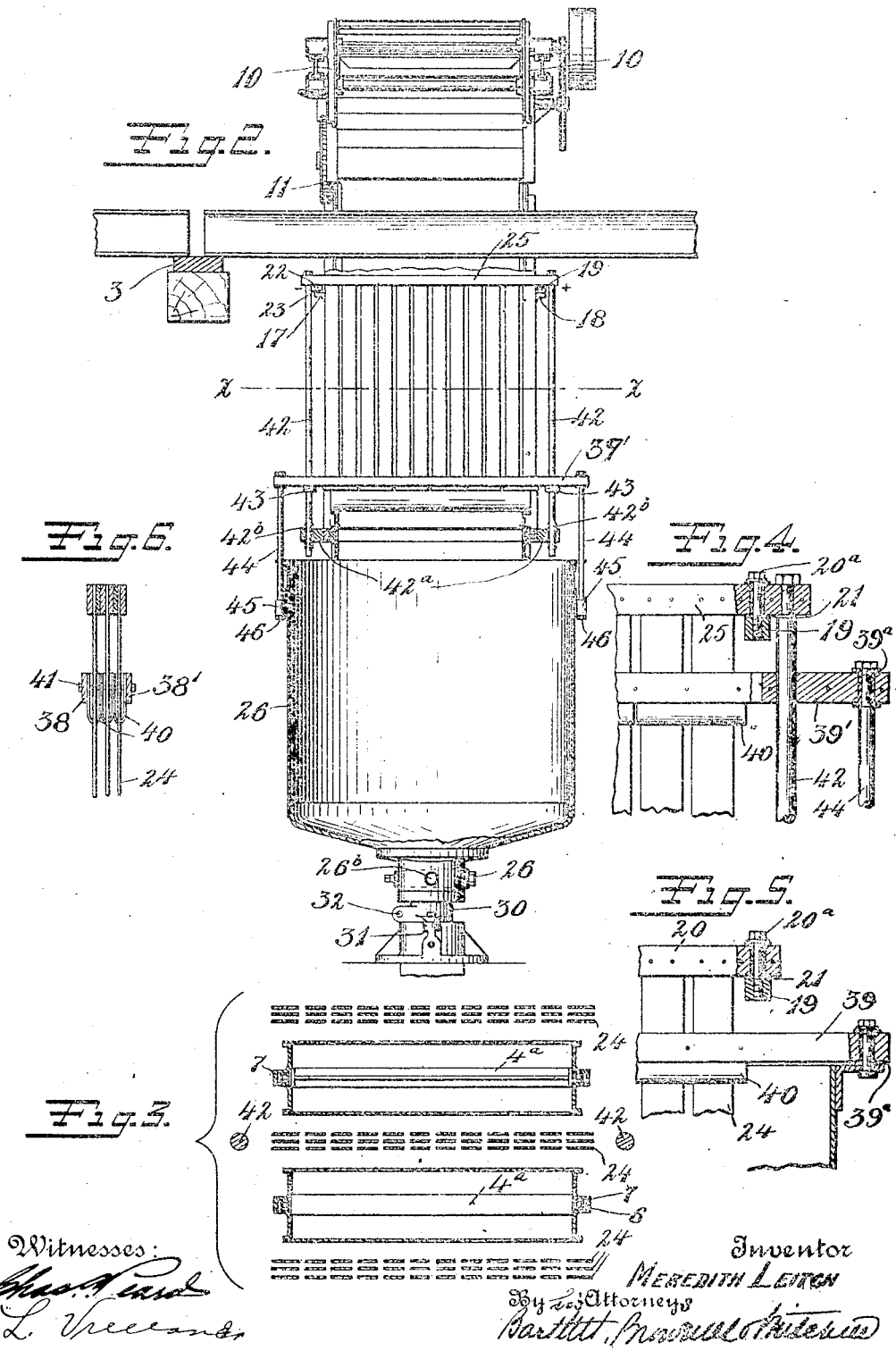

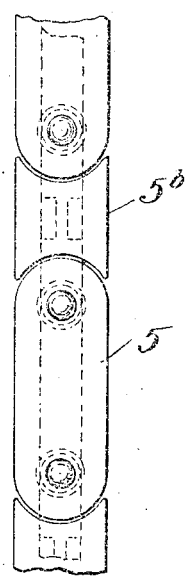
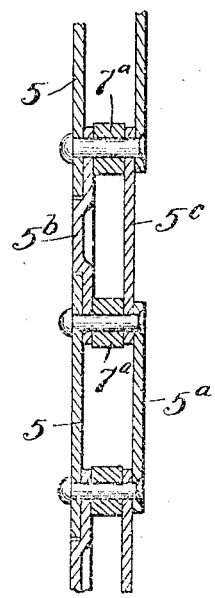
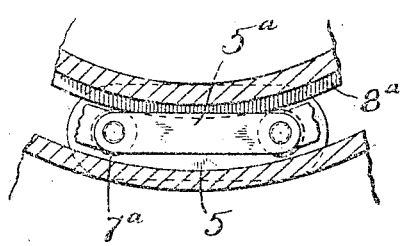
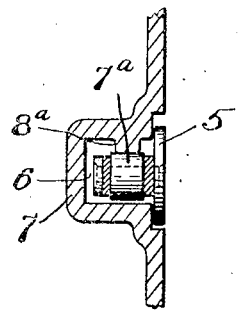

MEREDITH LEITCH, OF ELIZABETH, NEW JERSEY, ASSIGNOR, BY MESNE ASSIGNMENTS, TO METAL PROCESS COMPANY, A CORPORATION OF NEW YORK.

APPARATUS FOR DETINNING TIN-SCRAP.

No. 906,726.    Specification of Letters Patent.    Patented Dec. 15, 1908.

Application filed February 23, 1907. Serial No. 359,854.

*To all whom it may concern:*

Be it known that I, MEREDITH LEITCH, a citizen of the United States, residing at Elizabeth, county of Union, State of New Jersey, have invented certain new and useful Improvements in Apparatus for Detinning Tin-Scrap, of which the following is a full, clear, and exact description.

My invention relates to improvements in apparatus for detinning tin scrap and has for its object to produce an apparatus whereby the detinning can be carried on more expeditiously than heretofore and better results obtained.

It further has for its object to provide an apparatus in which the internal parts can be easily inspected from time to time, it being desirable to inspect all parts at least once in every twenty-four hours.

It further has for its object to produce an apparatus in which all the electrical connections can be made permanent without interfering with such inspection or the removal of the deposit from the cathodes.

It further has for its object to reduce the size and also the expense of the apparatus of a given capacity and to provide a convenient means for removing the deposit on the cathodes, and to secure other advantages hereafter described, and particularly pointed out in the claims.

My present invention is an improvement upon the invention disclosed in my application, Serial No. 301,585, filed February 17, 1906.

In the apparatus of my prior application, a stationary basket for containing the tin scrap and a stationary tank for containing the electrolyte were provided, the cathodes being raised out of the electrolyte for cleansing. The stationary tank surrounding the stationary basket made it practically impossible to examine the basket critically, and very often wires or pieces of scrap would protrude through the orifices of the basket, so as to make contact with the cathodes and thereby establish a short circuit. Furthermore, the basket became covered with slime and droppings from the plates and could not be thoroughly cleansed. Furthermore the drops from the plates remained in the bottom of the tank, which could not be easily emptied. Furthermore the electrical connections between the busbars and the cathodes could not be permanent and therefore introduced more resistance than was desirable, and at times when foreign matter was present, introduced very objectionable resistance. In addition, special means had to be provided for handling the cathode plates and removing them to a distance for cleansing. Furthermore, the discharge opening of the basket had to be raised above the bottom a distance at least equal to the length of the cathode plate, in order that the cathode plate might be raised so as to be removed. This not only involved the expense of a larger structure, but was inconvenient on account of the greater space which it required.

All the foregoing objections are removed in my present apparatus, and furthermore in the process carried out thereby, the tank for holding the electrolyte is thoroughly cleansed at the end of each detinning cycle and all the slime and droppings removed therefrom and the electrolyte, together with the matter contained therein, is subjected to such action that all solid foreign matter is removed from the electrolyte, so that it returns to the tank in a clear condition as distinguished from the otherwise muddy condition. Furthermore the soap which forms during the detinning process is entirely removed from the electrolyte and various other advantages result. Further in my apparatus the cathodes are automatically cleaned, being scraped of the deposit by scrapers, which are carried by the tank and thus pass over the cathode plates whenever the tank descends. Furthermore, the cathodes in my apparatus are so constructed as to afford a very large surface for deposition, resulting in a very low amperage density, such as is desirable in an electrolytic detinning apparatus. Furthermore, the conveyer is so constructed that the scrap does not bind between the conveyer bars and the basket, as is found to be the case when the conveyer bars fill the passage through the basket. Furthermore, I have devised means whereby the carbonating of the electrolyte is very much lessened, thus the frequency of regenerating the electrolyte is very much reduced. I have discovered that this latter result may be brought about by eliminating all waterfalls in the circulation system and thus preventing the entraining of air and the carbonic acid which is necessarily present therein.

The following is a description of my invention, reference being had to the accompanying drawings, in which:

Figure 1 is a side elevation of the apparatus with the tank lowered, the side of the tank being partly broken away. Fig. 2 is a view of the apparatus of Fig. 1, partly in front elevation and partly in section. Fig. 3 is a horizontal section on the line X X of Fig. 2 slightly enlarged. Fig. 4 is an enlarged detail view of the central cathode plates and scrapers. Fig. 5 is an enlarged detail view of a portion of the outside cathode plates and scrapers. Fig. 6 is a sectional view showing the relation of the cathode plates and scrapers. Figs. 7, 8, 9 and 10 are detail views of the conveyer chain.

Referring more particularly to the drawings: 1 is a stationary metallic basket having in that portion which is within the electrolyte perforated sides. $1^a$ is a hinged door for charging the basket. The basket is supported by U-beams 2, 2, which rest upon the flooring 3. Within the basket is a conveyer chain 4, made up of links 5, $5^a$, $5^b$, $5^c$, which move in grooves 6 formed in off-sets 7. The links $5^a$ and $5^c$ are of the shape shown at $5^a$ in Fig. 9. The link $5^b$ is the same as $5^c$ with the addition of an expanded portion lying in the same plane as the link 5. This expanded portion coöperates with the link 5, both of which have abutting surfaces concentric with the pivots, so as to form a continuous cover for the slot 7. The pivots connecting these links carry rollers $7^a$ for reducing the friction as the chains pass around the curve 8 at the lower portion of the basket. The grooves 7 are provided at the curves with raised tracks $8^a$ forming grooves into which enter the body portions of the links, as shown in Fig. 9. Cross-bars $4^a$ are provided occupying about one-third of the width of the basket. With these proportions there is less liability to clog than when the cross-bars are substantially the full width of the basket. The conveyer chains pass over pulleys 9, 10 and 11 at each side of the conveyer, the driving power being applied to the pulley 9, which is provided with sprocket teeth to engage the chain. The sprocket 9 is driven by a worm wheel $9^a$ and a worm 12 mounted on a shaft provided with a bevel gear $12^a$, driven by the bevel gear $12^b$ on the shaft of the wheel 13, which wheel is driven by the chain 14, passing over a sprocket 15 on the shaft of the driving pulley 16.

The basket is provided with four off-sets 17, 18. The off-sets 18 are electrically connected to a conductor 19, the contacting surfaces being preferably brazed together. The cross-bars 20 are secured to the conductor 19 by bolts $20^a$ and separated therefrom by insulation 21 and are brazed at their other ends to the conductor 22, which is separated from the off-set 17 and the basket by insulation 23. Each bar 20 carries three series of cathode plates 24. These plates are parallel to the body of the basket 1, and thus have their broad sides turned toward the scrap. This relation is particularly advantageous because it permits of the use of a simple scraper for removing the tin deposit upon the plates. I have discovered that if these plates are limited to a width of about three inches, the deposit which takes place on all sides of them will be of substantially equal depth. The electrolyte circulates freely between them and the front and rear sides are both covered with the deposited matter. A third cross-bar 25 is located between the two portions of the basket and is electrically connected with the conductor 22 and is secured to and electrically insulated from the conductor 19 in the same manner as is the bar 20. This bar also carries plates 24 which are similar to the other plates 24, except that they are of less length, since they cannot extend to the bottom of the tank being within the turn or bend of the basket.

26 is a tank for the electrolyte which is supported by a hydraulic piston 27 working within the cylinder 28. This hydraulic piston has a packing 29 and at its upper end a collar 30 bolted to the flange 31. This collar 30 is a split collar, the two ends of which can be brought together by the screw 32. This permits the plunger 27 to be clamped so as to be readily held in either its upper position or its lower position for purposes hereinafter described. The tank 26 is separated from the plunger by insulation 33, so as to prevent short-circuiting. The tank is provided with an overflow 34 and with inlet and outlet pipes 35, 36, and means $37^2$ for heating the electrolyte and a pump $38^2$ for causing it to circulate. The mouth of the inlet 35 opens beneath the level of the electrolyte when the tank 26 is raised to the position shown in dotted lines in Fig. 1 and in use and thus prevents a waterfall and the entraining of air and carbonic acid gas. To the upper flange of the tank are secured three scrapers consisting of bars 39, 39 carrying scraping blades 40 bolted thereto by bolts 41. These scraping blades embrace the plates 24 of the cathode and as the tank is lowered scrape the cathode surface and remove the deposited matter therefrom. A similar scraper having a bar 39' is provided for the central plates 24, but inasmuch as these plates are of less length than the length of the outside plates 24 and it is not possible to have the scraper bar 39' move the same distance as the scraper bars 39, I provide means for permitting lost motion. These means consist of two rods 42 depending from the central cross-bar 25 and carrying stops 43. These stops limit the downward motion of the scraper bar 39'. The scraper bar 39' is provided with depending rods 44 which pass through the flanges of the tank and through a stop 45, being provided at their lower ends with heads 46. With this construction, there is lost motion present, the result being that while the tank in its lowering movement will pull the cross-bar 39' down to the stops 43, the cross-bar 39' will rest at that point.

The cylinder 28 is connected with an accumulator 47, which has a ram of the same dimensions as the ram 27 and carries a weight 48, which is less than the weight on the tank when filled with electrolyte and greater than the weight of the tank when emptied. When the full tank is lowered, its weight automatically raises the accumulator weight 48, being permitted to do so by the unclamping of the collar 30. When the tank has reached its lowermost position, the collar 30 is again clamped while the electrolyte is removed. When the collar 30 is again released, the accumulator 48 will force the empty tank upward into its normal position.

The cross-bar 20 is fastened to the conductor 19 by bolts which pass through insulation 20ᵇ so that the cross-bars are insulated from the tank. The cross-bars 39' and 39' are separated from the tank and the rods 44 by similar insulation and are, therefore, insulated from the tank. The rods 42 are held at their lower ends by arms 42ᵃ, insulation 42ᵇ being interposed so as to insulate the rods 42 from the basket, this being necessary because they are electrically connected to the cross-bars 25 and to the scraper 39'.

In operating the apparatus, starting with the parts in the positions shown in Figs. 1 and 2, the clamping ring 30 is first loosened, whereupon the accumulator weight 48 forces the piston 27 carrying the now empty tank 26 upward into the position shown in dotted lines, Fig. 1. The clamping ring 30 is then tightened so as to hold the tank in raised position. The tank is then filled with the electrolyte, the same being introduced by the pipe 35. Scrap is then introduced in the U-shaped basket through the door 1ᵃ. It may be shoveled in as fast as the conveyer moves, or may be shoveled at intervals somewhat faster so as to fill the space inside of the door, which then can be closed so as to be held by its latch until more is needed. When scrap has been supplied, the current is switched on, the positive lead being connected to the basket 1 and the negative to the cathode plates 24, and detinning begins as described in my previously mentioned application, the conveyer causing a substantially continuous mass of scrap to pass through the stationary basket. After the cathode plates 24 are sufficiently coated with tin, the conveyer is stopped and the current switched off. The clamping ring is then loosened with the result that the tank descends lifting the accumulator plunger and weight 48. When the tank 26 has reached the lowermost position it is again clamped by the ring 30 so as to be held in place. At this stage the stop-cock 26ᵃ is opened, and the liquid in the tank drawn out through a hose connected to the vent 26ᵇ, preferably by the means of a centrifugal pump (not shown), the tank being washed out by a stream of caustic soda in order to thoroughly cleanse it of all tin powder and slime. The tin powder is scraped from the cathode plates 24 by the scrapers 40 as the tank descends and falls directly into the electrolyte. The electrolyte, together with the tin powder and slime is conveyed to a clarifying apparatus, preferably a centrifugal filter (not shown), where the solid matter is removed from the liquid. This operation not only removes the tin powder and slime but also removes the soap which is formed in the detinning bath if any hydrocarbons are introduced therein with the scrap to be detinned. After the electrolyte has been removed from the tank, the clamping ring 30 is again loosened and the tank allowed to ascend under the action of the accumulator to its uppermost position where it is again clamped. It is again filled with the purified electrolyte and the conveyer started and the current switched on.

Throughout the detinning operation the electrolyte which is within the tank is kept in circulation, and is also kept heated by the means of the circulating system, consisting of the pipes 35 and 36, the heater 37ᵃ and the pump 38. The mouth of the pipe 35 descends enough so that it is always just below the surface of the detinning bath during the circulation period. This prevents the formation of any waterfalls and the consequent entraining of air and carbonic acid gas. By thus preventing the entraining of carbonic acid gas the life of the electrolyte is very much lengthened, because it becomes carbonated less quickly. In order to prevent the caustic soda from becoming fatigued by reason of the carbonating that necessarily takes place, I preferably withdraw a portion of it from time to time, and after regenerating it, return it to the system.

When the tank 26 is lowered the basket and cathode should be carefully examined so as to see that no wires or other metallic bodies protrude from the basket so as to make contact with the cathode and thus form short circuits. The tin scrap which lodges in the U of the basket should also be removed at this time. The system should preferably be kept in continuous operation day in and day out, and it is an advantage to have several detinning baths, or enough to keep one gang of men fairly busy in lowering and raising the tanks and removing the accumulated tin powder from the electrolyte, since when the tanks are raised and the current turned on they require but little attention, the greater part of the labor being that required to recover the tin powder and remove the slime etc. from the electrolyte.

As before pointed out all the electrical connections between the basket, cathodes and conductors are permanent, and by reason of having the basket and cathodes relatively stationary the basket can be made much shorter. The basket and cathode plates can be inspected in all parts and the tin powder, which may lodge on the basket, can be removed. In the old form of apparatus some tin powder would unavoidably drop into the electrolyte, and since there was no practical way of removing it, could not be recovered. The baths became full of slime, soap and mud, so much so as often times to become quite thick and very dirty. By the present arrangement the electrolyte being frequently filtered, is kept in a condition of high efficiency. The system is provided with automatic scrapers. The particular scraper shown and described is simple and efficient. The plates are subdivided so as to permit a deposit of substantial uniform depth on both sides. The discharge of the suction pump of the circulating system enters the heating tank near its bottom and forces the lye drawn from the bath into the bottom of the heating boiler, and up to a level slightly above the desired level of the electrolyte in the bath so that it flows by gravity with a gentle flow to the bath. The mouth of the suction pipe, which is within the detinning bath, is near the bottom of the tank when in elevated position. When the pump is in operation, the effect is to draw the electrolyte from the baths near the bottom where it is coolest, and force it into the heating boiler to a height above the level in the bath so that it flows out into the baths by its own head. It leaves the heating boiler without entraining air, as the mouth of the return pipe is below the surface therein, and delivers the lye into the bath below the surface so as not to drive in any air at that point. The lye with this arrangement becomes carbonated much more slowly than is the case in systems where the circulation takes place with one or more waterfalls. The inlet and outlet pipe of the circulating system are, of course, shut off by valves while the tank is lowered.

The improved method whereby carbonating is diminished is claimed in a pending application No. 453,876, filed September 19, 1908.

What I claim is:

1. In a detinning apparatus, the combination of one element consisting of a cathode and an anode relatively stationary, a second element consisting of a tank for the electrolyte, means for raising and lowering one of said elements and a scraper for said cathode connected to said tank.

2. In a detinning apparatus, the combination of one element consisting of a cathode and an anode relatively stationary, a second element consisting of a tank for the electrolyte, means for raising and lowering one of said elements, and a scraper for said cathode moving with said tank and connected thereto so as to permit lost motion.

3. In a detinning apparatus, the combination of a cathode, an anode, a tank for the electrolyte, a hydraulic plunger for lowering and raising said tank, and an accumulator connected with the cylinder of said plunger, said accumulator being overcome by the weight of said tank when full and overcoming the weight of said tank when empty.

4. In a detinning apparatus, the combination of a cathode, an anode, a tank for the electrolyte, a hydraulic plunger for lowering and raising said tank, an accumulator connected with the cylinder of said plunger, said accumulator being overcome by the weight of said tank when full and overcoming the weight of said tank when empty, and means for restraining and releasing said tank.

5. In an electrolytic detinning bath, the combination of a tank, an anode having a flat surface, a series of cathode plates lying in one plane and parallel to said surface the width of said plate being such as to make the resistance of the electrolyte between a point on the anode and all points on any one of said cathode plates approximately equal.

6. In an electrolytic detinning bath, the combination of a tank, an anode having a flat surface, a plurality of series of cathode plates carried from a common support, said several series being parallel to each other the plates of each series lying in the same plane and being of such width as to make the resistance of the electrolyte between a point on the anode and all points on any one of said cathode plates approximately equal.

7. In an electrolytic detinning bath, the combination of a tank, an anode, a flat cathode, a scraper engaging said cathode and stationary relatively to said tank, said cathode and said tank being relatively movable along a line normal to the surface of the electrolyte.

8. In an electrolytic detinning apparatus, the combination of a tank, a plurality of series of plates within said tank forming a cathode, horizontal scrapers normally located near the top of and engaging the flat surfaces of said cathode plates, and means for raising and lowering said tank and scrapers.

9. In a detinning apparatus the combination of a stationary U-shaped basket having internal grooves extending along the sides thereof, a conveyer within said basket having chains traveling in said grooves and antifriction rollers carried by said chains and engaging said grooves.

10. In a detinning apparatus, the combination of a stationary U-shaped basket having internal grooves extending along the sides thereof, a conveyer within said basket having chains traveling in said grooves and antifriction rollers carried by said chains and engaging said grooves, said chains having inner surfaces wider than said grooves.

11. In a caustic soda electrolytic apparatus, the combination of a plurality of vessels, a tin bearing anode and a cathode in one of said vessels, a source of current having its positive and negative leads connected to said anode and cathode respectively, feeding and return pipes for causing caustic soda to circulate within and discharge into said vessels, the discharge mouths of said pipes being covered by the electrolyte in the vessels into which they discharge.

12. In a caustic soda electrolytic apparatus, the combination of a plurality of vessels, a tin bearing anode and a cathode in one of said vessels, a source of current having its positive and negative leads connected to said anode and cathode respectively, feeding and return pipes for causing caustic soda to circulate within and discharge into said vessels, the discharge mouths of said pipes being covered by the electrolyte in the vessels into which they discharge, the mouth of the return pipe in the vessel containing the anode and cathode being located near the bottom of said vessel.

13. In a detinning apparatus, the combination of a stationary U-shaped basket having internal grooves extending along the curved portion thereof, chains traveling in said grooves, and anti-friction rollers carried by said chains and engaging said grooves, said grooves having inward projections engaged by said anti-friction rollers.

MEREDITH LEITCH.

Witnesses:
  HARRY L. SODEN,
  DABNEY LEITCH.